United States Patent
Zeng et al.

(10) Patent No.: US 12,129,203 B1
(45) Date of Patent: Oct. 29, 2024

(54) CONCRETE WITH OIL SHALE WASTE RESIDUE AS AGGREGATES AND PREPARATION METHOD THEREOF

(71) Applicant: Northeast Electric Power University, Jilin (CN)

(72) Inventors: Cong Zeng, Jilin (CN); Dehong Wang, Jilin (CN); Yunyi Wang, Jilin (CN); Wenqi E, Jilin (CN)

(73) Assignee: NORTHEAST ELECTRIC POWER UNIVERSITY, Jilin (CN)

( * ) Notice: Subject to any disclaimer, the term of this patent is extended or adjusted under 35 U.S.C. 154(b) by 0 days.

(21) Appl. No.: 18/672,206

(22) Filed: May 23, 2024

(30) Foreign Application Priority Data

Aug. 28, 2023 (CN) .......................... 202311087296.0

(51) Int. Cl.
*C04B 18/12* (2006.01)
*C04B 20/02* (2006.01)
*C04B 28/00* (2006.01)

(52) U.S. Cl.
CPC .................................. *C04B 18/125* (2013.01)

(58) Field of Classification Search
CPC ....... C04B 18/125; C04B 18/12; C04B 18/04; C04B 20/02; C04B 28/00; Y02W 30/91
See application file for complete search history.

(56) References Cited

FOREIGN PATENT DOCUMENTS

| CN | 111410474 A | 7/2020 |
| WO | 2006129352 A1 | 12/2006 |

OTHER PUBLICATIONS

G Zhang, F Zhao, X Cheng, S Huang, C Zhang, M Zhou, K Mei, L Zhang, Resource utilization from solid waste originated from oil-based shale drilling cutting during shale gas development, Chemosphere, vol. 298, 134318, DOI: 10.1016/j.chemosphere.2022. 134318. (Year: 2022).*
Mahasneh, Bassam. (2014). Oil Shale as an Aggregate in Making Concrete Mix. Electronic Journal of Geotechnical Engineering. (Year: 2014).*
First Office Action for China Application No. 202311087296.0, mailed Feb. 24, 2024.
Notification to Grant Patent for China Application No. 202311087296. 0, mailed Mar. 25, 2024.
First Search Report for China Application No. 202311087296.0, dated Feb. 22, 2024.
Supplementary Search Report for China Application No. 202311087296. 0, dated Mar. 15, 2024.

* cited by examiner

*Primary Examiner* — Anthony J Green
*Assistant Examiner* — Marites A Guino-O Uzzle
(74) *Attorney, Agent, or Firm* — Piloff Passino & Cosenza, LLP; Rachel Piloff; Sean Passino

(57) ABSTRACT

A concrete with oil shale waste residue as aggregates and a preparation method thereof are provided by the present disclosure, belonging to the technical field of concrete. Oil shale waste residue is used to partially or completely replace the fine aggregates and coarse aggregates in the concrete, where the oil shale waste residue is deoiled oil shale waste residue. The oil shale waste residue is subjected to oil removal treatment and applied to the preparation of concrete.

5 Claims, 2 Drawing Sheets

CONCRETE WITH OIL SHALE WASTE RESIDUE AS AGGREGATES AND PREPARATION METHOD THEREOF

CROSS-REFERENCE TO RELATED APPLICATIONS

This application claims priority to Chinese Patent Application No. 202311087296.0, filed on Aug. 28, 2023, the contents of which are hereby incorporated by reference.

TECHNICAL FIELD

The present disclosure belongs to the technical field of concrete, and in particular to a concrete with oil shale waste residue as aggregates and a preparation method thereof.

BACKGROUND

The comprehensive utilization of resources is a major step towards the in-depth implementation of the sustainable development strategy. Bulk solid waste, with a large volume and wide coverage, outstanding environmental impact and broad prospects for use, represents a core area for the comprehensive use of resources. It is of great significance to promote the comprehensive utilization of bulk solid waste to improve the efficiency of resource utilization, improve the quality of the environment and promote the comprehensive green transformation of economic and social development. The extensive application of ordinary concrete and the comprehensive utilization of large amounts of bulk solid waste, the use of a variety of low-carbon and green development in the comprehensive utilization of bulk solid waste have become significant focus areas of the comprehensive utilization of bulk solid waste.

Ordinary concrete refers to the artificial stone made of cement as the main cementitious material, with water, sand, pebbles in appropriate proportions, with chemical admixtures and mineral admixtures if necessary, followed by uniform mixing, dense molding and hardening with maintenance.

In the concrete, sand and pebbles serve as the skeleton, called aggregate; cement and water form cement mortar, which is wrapped around the surface of the aggregate and fills the voids of the aggregate. Before hardening, the cement plays a lubricating role, giving the mixture a certain workability to facilitate the construction. After the cement paste hardens, the aggregate is cemented into a solid whole.

The main waste produced after oil shale refining is oil shale waste residue, in which the main components are $SiO_2$ and $Al_2O_3$, etc. The common way of treatment is to bury the waste in landfill or directly pile it in the open air, which not only affects the cityscape and occupies a lot of land resources, but also causes secondary pollution to the environment.

Among the conventional building materials such as wood, steel, cement and aluminum, concrete is the building material with the lowest energy consumption for production, and producing concrete from oil shale waste residue is an effective way to dispose of the consumed oil shale waste residue, and after grinding the oil shale waste residue finely, the 28$d$ compressive strength of the concrete prepared in the form of cementitious material is generally less than 5 megapascals (MPa), which is difficult to be applied in the practical application of the project.

SUMMARY

In order to solve the above technical problems, the present disclosure provides a concrete with oil shale waste residue as aggregates and a preparation method thereof. The 7-day compressive strength of the concrete with oil shale waste residue as aggregate reaches 36.2 megapascals (Mpa), which has a good practical application prospect.

In order to achieve the above objectives, the present disclosure provides a concrete with oil shale waste residue as aggregates, including replacing fine aggregates and coarse aggregates in a concrete partially or completely; where the oil shale waste residue is a deoiled oil shale waste residue.

Optionally, a preparation method of the deoiled oil shale waste residue includes: adding a degreasing agent into the oil shale waste residue, conducting hot washing and standing to obtain the deoiled oil shale waste residue.

Optionally, a material-liquid ratio of the oil shale waste residue to the degreasing agent is 1 kilograms (kg): 5 liters (L). There is no obvious effect of oil removal if the material-liquid ratio is too small, and the cost of oil removal will be greatly increased if the ratio is too large, and the material-liquid ratio is finally determined to be 1 kg:5 L.

Optionally, the degreasing agent is sophorolipid or Polysorbate 80 (Tween 80®).

Optionally, a concentration of the sophorolipid or the Polysorbate 80 (Tween 80®) is 20-60 milligrams per liter (mg/L).

Optionally, concentrations of the sophorolipid or the Polysorbate 80 (Tween 80®) are all 20 mg/L, 40 mg/L or 60 mg/L.

Optionally, a concentration of the Polysorbate 80 (Tween 80®) is 60 mg/L.

Optionally, a temperature of the hot washing is 40 degrees Celsius (° C.). Under the condition of hot washing temperature 40° C., the sophorolipid or Polysorbate 80 (Tween 80®) gives better adsorption and formation of oil film, the oil film formation is too slow at too low temperature, which is unfavorable to the experiment, and the temperature is too high that may make the sophorolipid or Polysorbate 80 (Tween 80®) lose its activity, which may not satisfy the experimental results.

Optionally, when the deoiled oil shale waste residue is used as fine aggregates, the deoiled oil shale waste residue is ground into particles, with a particle size of the particles being 80 meshes; and
  when the deoiled oil shale waste residue is used as coarse aggregates, the deoiled oil shale waste residue is crushed into blocks, and particle sizes of the blocks are 5-10 millimeters (mm) and 10-20 mm.

The present disclosure employs the biosurfactant sophorolipid and Polysorbate 80 (Tween 80®) as degreasing agents for degreasing and cleaning of oil shale waste residue. Sophorolipid and Polysorbate 80 (Tween 80®) have two properties, being both lipophilic and hydrophilic. Sophorolipids and Polysorbate 80 (Tween 80®) also tend to concentrate on the solution surface to induce adsorption, thereby reducing the interfacial tension between the oil and solid phases. When the concentrations of sophorolipid and Polysorbate 80 (Tween 80®) in the solution is increasing, the adsorption amount on the interface is also increasing, which further reduces the surface tension and dissolves into the reagent solution with the extension of standing duration, thus achieving the objective of removing shale oil from the surface of oil shale waste residue. After oil removal, oil shale waste residue forms calcium silicate compounds (C—S—H) better in concrete due to the similarity of its composition with coarse and fine aggregates, and C—S—H is the main substance to improve the strength of concrete. Therefore, the oil shale waste residue after oil removal is a better substitute for coarse and fine aggregates to achieve the purpose of improving the strength of concrete.

A method for preparing the concrete with the oil shale waste residue as the aggregates includes following steps: based on a mixing ratio of C30 reference concrete, adding deoiled oil shale waste residue coarse aggregates and deoiled oil shale waste residue fine aggregates, standing, adding cement and stirring uniformly, adding half of water and half of water reducer and stirring uniformly, and finally pouring remaining water and a remaining water reducer and stirring uniformly to obtain the concrete with the oil shale waste residue as the aggregates.

Optionally, a method for preparing the concrete with the oil shale waste residue as the aggregates specifically includes following steps: based on a mixing ratio of C30 reference concrete, starting a mixer, adding the deoiled oil shale waste residue coarse aggregates and deoiled oil shale waste residue fine aggregates when the mixer is in normal operation, waiting for 2-3 minutes (min) for fully mixing, then adding cement and stirring for 2-3 min, adding half of water and half of water reducer and stirring for 1-2 min, and finally pouring remaining water and a remaining water reducer and stirring for 2-3 min to obtain the concrete with the oil shale waste residue as the aggregates.

Compared with the prior art, the present disclosure has the following advantages and technical effects.

Since the particle size of oil shale waste residue ground into particles is similar to that of fine aggregate, and the particle size of oil shale waste residue crushed into blocks is similar to that of coarse aggregate, as well as the oil shale waste residue contains a large amount of $SiO_2$ and $Al_2O_3$, it is reasonable to utilize oil shale particles instead of fine aggregate and coarse aggregate (i.e., oil shale waste residue is used as aggregates) in the preparation of concrete. However, oil shale waste residue is the residue of oil shale after low-temperature dry distillation; as low-temperature dry distillation technology is not able to achieve 100% refining, the oil shale waste residue may also contain a small amount of shale oil, with a small amount of shale oil attached to the surface; therefore, the concrete prepared directly from oil shale waste residue often has poor performance and is difficult to be applied in engineering practice. In order to solve this problem, the present disclosure removes oil from the oil shale waste residue, and then applies the oil shale waste residue to the preparation of concrete, which not only replaces fine aggregates such as sand and other coarse aggregates including pebbles, so as to reduce the utilization of concrete for sand and pebbles, directly reducing the cost of concrete, but also better protects sand and pebble resources, and at the same time complies with the concepts of solid waste utilization as well as sustainable development; moreover, when the replacing rate is 40%, the 7-day compressive strength of concrete prepared from deoiled oil shale waste residue as aggregates reaches 36.2 Mpa, which fully meets the requirements of concrete strength, and when the substitution rate is 100%, the strength of the concrete still fully meets the requirements, suggesting that the preparation of full-aggregate concrete from deoiled oil shale waste residue is completely feasible.

BRIEF DESCRIPTION OF THE DRAWINGS

The accompanying drawings, which constitute a part of the present disclosure, are used to provide a further understanding of the present disclosure, and the illustrative embodiments of the present disclosure and their descriptions are used to explain the present disclosure, and do not constitute an undue limitation of the present disclosure. In the attached drawings.

DETAILED DESCRIPTION OF THE EMBODIMENTS

Figure 1:
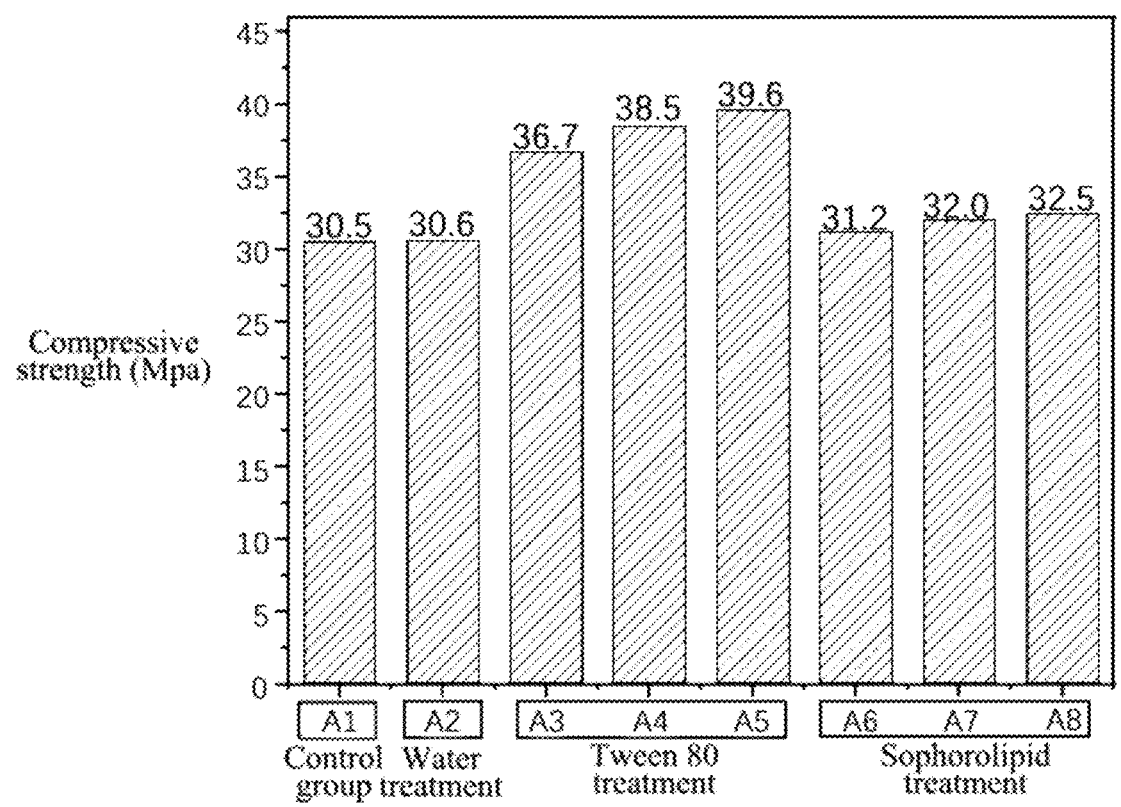
FIG. 1 shows the 7-day compressive strength of concrete prepared in Embodiments 7-12 and Comparative embodiments 3-4.

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. Intermediate values within any stated value or stated range, as well as each smaller range between any other stated value or intermediate values within the stated range are also included in the present disclosure. The upper and lower limits of these smaller ranges can be independently included or excluded from the range.

Unless otherwise specified, all technical and scientific terms used herein have the same meaning as commonly understood by one of ordinary skill in the art to which this present disclosure relates. Although the present disclosure only describes the preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes may be made to the specific embodiments of the present disclosure without departing from the scope or spirit of the present disclosure. Other embodiments will be apparent to the skilled person from the description of the present disclosure. The description and embodiments of that present disclosure are exemplary only.

The terms "including", "comprising", "having" and "containing" used in this specification are all open terms, which means including but not limited to.

Embodiment 1

Polysorbate 80 (Tween 80®), a degreasing agent with a concentration of 20 mg/L, is added to the oil shale waste residue, and the material-liquid ratio of oil shale waste residue to the degreasing agent is 1 kg: 5 L. After hot washing at 40° C. and standing for 30 min, the deoiled oil shale waste residue is obtained, which is designated as A3.

Embodiment 2

Same as Embodiment 1, differing only in that the concentration of Polysorbate 80 (Tween 80®) is 40 mg/L, and the deoiled oil shale waste residue obtained is noted as A4.

Embodiment 3

Same as Embodiment 1, with the difference being only that the concentration of Polysorbate 80 (Tween 80®) is 60 mg/L, and the deoiled oil shale waste residue obtained is noted as A5.

Embodiment 4

Same as in Embodiment 1, the only difference is that the degreasing agent is sophorolipid with a concentration of 20 mg/L, and the deoiled oil shale waste residue obtained is designated as A6.

Embodiment 5

The same as in Embodiment 1, the only difference is that the degreasing agent is sophorolipid with a concentration of 40 mg/L, and the deoiled oil shale waste residue obtained is designated as A7.

Embodiment 6

The same as in Embodiment 1, the only difference is that the degreasing agent is sophorolipid with a concentration of 60 mg/L, and the deoiled oil shale waste residue obtained is designated as A8.

Comparative Embodiment 1

With no treatment of oil shale waste residue, designated as A1.

Comparative Embodiment 2

It is the same as Embodiment 1, but the only difference is that the degreasing agent is replaced by the same amount of water, which is denoted as A2.

See Table 1 for the experimental schemes of oil shale waste residue degreasing in Embodiments 1-6 and Comparative embodiments 1-2.

TABLE 1

Oil removal experimental scheme of oil shale waste residue

| S/N | Degreasing material | Concentration (mg/L) | Hot washing temperature (° C.) | Standing duration (min) |
|---|---|---|---|---|
| A1 | / | / | / | / |
| A2 | Water | / | 40 | 30 |
| A3/A4/A5 | Polysorbate 80 (Tween 80 ®) | 20/40/60 | 40 | 30 |
| A6/A7/A8 | Sophorolipid | 20/40/60 | 40 | 30 |

Embodiments 7-12

The deoiled oil shale waste residue from Embodiment 1-6 is ground into particles with a particle size of 80 mesh for later use.

Based on the ratio of C30 reference concrete, the mixer is started, and when it is in normal operation, the particles of deoiled oil shale waste residue are added and waited for 2-3 min to make it fully mixed, and then cement (P.O42.5 ordinary silicate cement) is added and stirred for 2-3 min, and then half of water and half of polycarboxylic acid high-efficiency water reducer PCE-101 are added and stirred for 1-2 min, and then finally, the rest of water and the polycarboxylic acid high-efficiency water reducer are poured and stirred for 2-3 min to obtain the concrete, and the specific ratio of concrete is shown in Table 2.

Comparative Embodiment 3

Concrete is prepared according to the method of Embodiments 7-12, only the difference is that the oil shale waste residue of Comparative embodiment 1 is added, and the specific proportion is shown in Table 2.

Comparative Embodiment 4

Concrete is prepared according to the method of Embodiments 7-12, only the difference is that the oil shale waste residue of Comparative embodiment 2 is added, and the specific proportion is shown in Table 2.

TABLE 2

Concrete proportion (kg/m³)

| Group No. | Cement | Fine aggregate | Oil shale waste residue particles | Coarse aggregate 5-10 mm | Coarse aggregate 10-20 mm | Water reducer | Water |
|---|---|---|---|---|---|---|---|
| Comparative embodiment 3 (A1) | 390 | 394.5 | 263 | 467.5 | 702.5 | 1.95 | 187.2 |
| Comparative embodiment 4 (A2) | 390 | 394.5 | 263 | 467.5 | 702.5 | 1.95 | 187.2 |
| Comparative embodiment 5 | 390 | 394.5 | 0 | 467.5 | 702.5 | 1.95 | 187.2 |
| Embodiment 7 (A3) | 390 | 394.5 | 263 | 467.5 | 702.5 | 1.95 | 187.2 |
| Embodiment 8 (A4) | 390 | 394.5 | 263 | 467.5 | 702.5 | 1.95 | 187.2 |
| Embodiment 9 (A5) | 390 | 394.5 | 263 | 467.5 | 702.5 | 1.95 | 187.2 |
| Embodiment 10 (A6) | 390 | 394.5 | 263 | 467.5 | 702.5 | 1.95 | 187.2 |
| Embodiment 11 (A7) | 390 | 394.5 | 263 | 467.5 | 702.5 | 1.95 | 187.2 |
| Embodiment 12 (A8) | 390 | 394.5 | 263 | 467.5 | 702.5 | 1.95 | 187.2 |

Note: the standard cubic cubes of 150×150×150 mm are selected for the compressive test, with 3 pieces in each group, and the average value is taken; the fine aggregate is sand with a particle size of 80 mesh, the coarse aggregate is pebbles, and the particle size of oil shale waste residue particles is 80 mesh.

The concretes prepared in Embodiments 7-12 and Comparative embodiments 3-4 are added to a standard cube mold, and the standard cube mold is placed on a vibration table, which requires a total of two vibrations, with half of the material being added for the first vibration, and the mold being filled for the second vibration and then vibrated until the surface is pulped and no bubbles are generated, and then the surface of the test block is smoothed and marked and demolded for the performance test.

The uniaxial compressive strength test of modified oil shale waste residue concrete is conducted as a preliminary screening for analyzing the properties of modified concrete. The test method refers to the "Standard for test method of mechanical properties on Ordinary concrete" (GB/T 50081-2002). 8 groups (concretes prepared from Embodiments 7-12 and Comparative embodiments 3-4) cubic test specimens of 150 mm×150 mm×150 mm, and 3 specimens are taken from each group for the compressive strength test, and the 200-ton microcomputer-controlled hydraulic press is used for the cubic compression test, with the pressure applied in the vertical direction along the casting, and the loading speed of specimens being 0.5 Mp/s; the values are read at the time of destruction of specimens and are presented as FIG. 1.

The following conclusions may be drawn from the uniaxial compressive strength test.

(1) Comparative analysis of compressive strength between A1 and A2 shows that washing oil shale waste residue particles with water will not affect the strength of concrete block.

(2) Comparative analysis of compressive strength of A3, A4 and A5 shows that the strength of the test block increases with the increase of Polysorbate 80 (Tween 80®) concentration.

(3) As an oil-removing material, Sophorolipid will affect the hydration reaction of concrete and increase the strength of concrete, but the increase is not obvious.

Through the strength analysis of reference blocks, it is concluded that 60 mg/L Polysorbate 80 (Tween 80®) is the best material to improve the mechanical properties of concrete.

Embodiments 13-17

Concretes with different substitution rates are prepared from the deoiled oil shale waste residue obtained by using Polysorbate 80 (Tween 80®) of 60 mg/L as the deoiling material in Embodiment 3. See Table 3 for specific proportions.

Among them, the amount of coarse and fine aggregates refer to the mixing ratio of the concrete itself, and the calculation method of replacing coarse and fine aggregates with deoiled oil shale waste residue at the same time is as follows: given a substitution rate of deoiled oil shale waste residue to replace coarse and fine aggregates, for example, 40%, then all of the coarse and fine aggregates are 60% of the base amount, that is, at this time, the amount of coarse and fine aggregates used=the amount of the original coarse and fine aggregates*(1−substitution rate %), and the amount of deoiled oil shale waste residue used=the total amount of coarse and fine aggregates*substitution rate.

The preparation method of the above concrete is as follows:

based on the ratio of C30 reference concrete, the mixer is started, and when it is running normally, coarse aggregate and fine aggregate are added, followed by waiting for 2-3 min to mix fully, then cement (P.O42.5 ordinary silicate cement) is added and stirred for 2-3 min, then silica fume is added, as well as half of water and half of polycarboxylic acid high efficient water reducer PCE-101 are added and stirred for 1-2 min, and finally the rest of water and water reducer are added and stirred for 2-3 min to obtain the concrete with oil shale waste residue as aggregates; since the substitution of coarse and fine aggregates by the deoiled oil shale waste residue will substantially reduce the properties of the concrete, in order to avoid a substantial reduction in the properties of the concrete, a silica fume is added to the preparation process of the concrete in the present disclosure, and the silica fume allows for a reduction in the porosity of the concrete, an improvement in the densification of the concrete, and an increase in the silicate content of the concrete, thereby contributing to an improvement in the strength and hardness of the concrete.

TABLE 3

Proportion of substituted aggregate content of oil shale waste residue (kg/m³)

| Group No. | Cement | Fine aggregate | Oil shale waste residue particles | Coarse aggregate 5-10 mm | Coarse aggregate 10-20 mm | Water reducer | Water | Silica fume | Substitution rate |
|---|---|---|---|---|---|---|---|---|---|
| Embodiment 13 (B1) | 390 | 236.7 | 625.8 | 280.5 | 421.5 | 1.95 | 187.2 | 48.2 | 40% |
| Embodiment 14 (B2) | 390 | 177.5 | 860.5 | 210.4 | 316.1 | 1.95 | 187.2 | 48.2 | 55% |
| Embodiment 15 (B3) | 390 | 118.4 | 1095.2 | 140.3 | 210.8 | 1.95 | 187.2 | 48.2 | 70% |
| Embodiment 16 (B4) | 390 | 59.2 | 1329.8 | 70.1 | 105.4 | 1.95 | 187.2 | 48.2 | 85% |
| Embodiment 17 (B5) | 390 | 0 | 1564.5 | 0 | 0 | 1.95 | 187.2 | 48.2 | 100% |

Note: standard cubes of 150×150×150 mm are selected for the compressive test, with 6 cubes in each group, and the average value is taken; the fine aggregate is sand with a particle size of 80 mesh, and the coarse aggregate is pebbles. For replacing fine aggregates, the deoiled oil shale waste residue is ground into particles of 80 mesh, and for replacing coarse aggregates, the deoiled oil shale waste residue is crushed into blocks of 5-10 mm and 10-20 mm.

Figure 2:
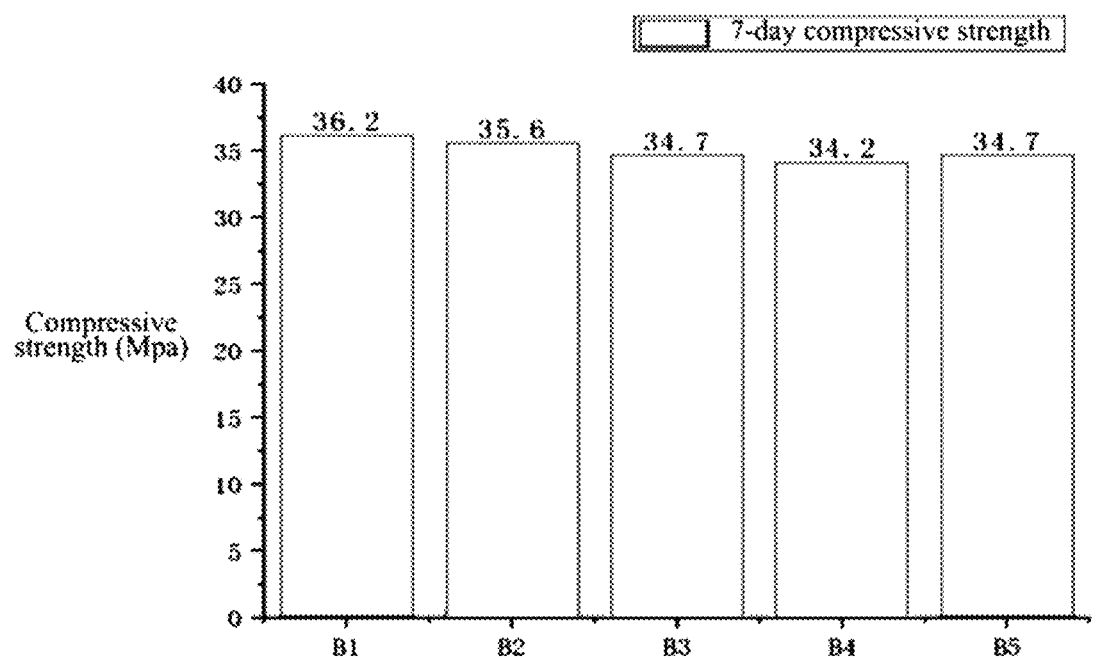
FIG. 2 shows the 7-day compressive strength of concrete prepared by replacing aggregate with deoiled oil shale waste residue in different proportions in Embodiments 13-17.

See FIG. 2 for the 7-day compressive strengths of concretes prepared with deoiled oil shale waste residue in different proportions in Embodiments 13-17. Through the analysis of FIG. 2, it is known that although the substitution ratio increases from 40% to 100% in the process, the compressive strength of concrete specimens is decreasing, but it is still in the reasonable range of the specification, and as compared with the concrete prepared directly with oil shale waste residue and no oil removal treatment, the strength of the concrete is improved, suggesting that it is feasible to use deoiled oil shale waste residue to replace all the aggregates; in addition to meeting the requirements of the strength, the use of oil shale is more effective in achieving the purpose of solid waste utilization.

Comparative Embodiment 5

Same as Embodiment 17, differing only in that the material-liquid ratio of oil shale waste residue to the degreasing agent Polysorbate 80 (Tween 80®) at 60 mg/L is 1 kg: 3 L. This material-liquid ratio requires an excessive amount of degreasing agent, which raises the cost of making concrete and is unsuitable for the application, and therefore no subsequent testing is conducted.

Comparative Embodiment 6

The same as Embodiment 17, the difference only lies in the material-liquid ratio of the oil shale waste residue and the degreasing agent Polysorbate 80 (Tween 80®) of 60 mg/L is 1 kg: 10 L. This material-liquid ratio requires less degreasing agent, but the degreasing effect is not good, so no follow-up test is conducted, and in summary, the 1 kg: 5 L is selected.

Comparative Embodiment 7

It is the same as Embodiment 17, but the only difference is that the hot washing temperature is 60° C. when preparing deoiled oil shale waste residue. This temperature is too high, and the oil remover will be partially inactivated, resulting in a not so good oil removal effect, so no subsequent testing is conducted.

Comparative Embodiment 8

Same as Embodiment 17, differing only in that the hot washing temperature for the preparation of the deoiled oil shale waste residue is 20° C. This temperature is too low for the degreasing agent to be effective in degreasing the oil, and there is no stimulated activity, so no subsequent testing is conducted. In summary, a hot washing temperature of 40° C. is determined.

The above describes only the preferred embodiments of the present disclosure, but the protection scope of the present disclosure is not limited to this, and any changes or substitutions that may be easily thought of by those familiar with the technical field within the technical scope disclosed by the present disclosure should be included in the protection scope of the present disclosure. Therefore, the scope of protection of the present disclosure should be based on the scope of protection of the claims.

What is claimed is:

1. A concrete with oil shale waste residue as aggregates, comprising replacing fine aggregates and coarse aggregates in a concrete partially or completely with oil shale waste residue as aggregates; wherein the oil shale waste residue is deoiled oil shale waste residue;
   a preparation method of the deoiled oil shale waste residue comprises: adding a degreasing agent into the oil shale waste residue, wherein a material-liquid ratio of the oil shale waste residue to the degreasing agent is 1 kg:5 L; conducting hot washing and standing to obtain the deoiled oil shale waste residue; wherein the degreasing agent is sophorolipid or Polysorbate 80;
   a concentration of the sophorolipid or Polysorbate 80 is 20-60 mg/L; and
   a temperature during the hot washing is 40° C.

2. The concrete with oil shale waste residue as aggregates according to claim 1, wherein concentrations of the sophorolipid or Polysorbate 80 are all of 20 mg/L, 40 mg/L or 60 mg/L.

3. The concrete with oil shale waste residue as aggregates according to claim 2, wherein a concentration of the sophorolipid is 60 mg/L.

4. The concrete with oil shale waste residue as aggregates according to claim 1, wherein when the deoiled oil shale waste residue is used as the fine aggregates, the deoiled oil shale waste residue is ground into particles, and a particle size of the particles is 80 meshes; and
   when the deoiled oil shale waste residue is used as the coarse aggregates, the deoiled oil shale waste residue is crushed into a mixture of blocks of different particle sizes, and the different particle sizes are 5-10 mm and 10-20 mm.

5. A method for preparing the concrete with oil shale waste residue as aggregates according to claim 1, comprising following steps: adding deoiled oil shale waste residue coarse aggregates and deoiled oil shale waste residue fine aggregates, standing, adding cement, stirring, adding half of water and half of water reducer, stirring, and finally adding remaining water and a remaining water reducer and stirring to obtain the concrete with the oil shale waste residue as the aggregates.

* * * * *